US007120795B2

(12) United States Patent
Raphael et al.

(10) Patent No.: US 7,120,795 B2
(45) Date of Patent: Oct. 10, 2006

(54) SECURITY SYSTEM WITH SERIAL NUMBER CODING AND METHODS THEREFOR

(75) Inventors: Martin Raphael, East Hills, NY (US); Kenneth L. Addy, Massapequa, NY (US)

(73) Assignee: Honeywell International, Inc., Morristown, NJ (US)

( * ) Notice: Subject to any disclaimer, the term of this patent is extended or adjusted under 35 U.S.C. 154(b) by 833 days.

(21) Appl. No.: 10/115,420

(22) Filed: Apr. 3, 2002

(65) Prior Publication Data

US 2003/0191959 A1 Oct. 9, 2003

(51) Int. Cl.
*H04L 9/12* (2006.01)
*G06F 17/00* (2006.01)

(52) U.S. Cl. ........................................ 713/168; 700/90

(58) Field of Classification Search ................ 713/168; 340/3.1; 700/90
See application file for complete search history.

(56) References Cited

U.S. PATENT DOCUMENTS 5,970,148 A * 10/1999 Meier ......................... 713/168
6,400,265 B1 6/2002 Saylor et al.
6,552,647 B1 * 4/2003 Thiessen et al. ............. 340/3.1
2002/0091805 A1 7/2002 Phillips et al.
2003/0023874 A1 * 1/2003 Prokupets et al. .......... 713/201
2003/0063742 A1 * 4/2003 Neufeld et al. ............... 380/46

* cited by examiner

*Primary Examiner*—Matthew Smithers
(74) *Attorney, Agent, or Firm*—Anthony R. Barkume, P.C.

(57) ABSTRACT

Using an existing system of formatting for RF message transmission and receiving, additional information can be sent to an alarm control panel to sort classes of messages (and hence equipment) without changing hardware, RF or baseband timing, power levels, etc., and therefore not affect FCC rules and registration of many individual products. A plurality of security devices are programmed with a unique identification number by generating a series of initial serial numbers, and then applying a masking algorithm to the serial number. Only if the masking application provides a true result will the security device be programmed with that serial number. At installation, the serial number is obtained from the security device, and the masking algorithm is applied to the serial number. Depending on its use in the security system, registration is allowed only if the masking algorithm application provides a true result.

18 Claims, 9 Drawing Sheets

| 5 | 4 | 3 | 2 | 1 | 0 | ENABLE |
|---|---|---|---|---|---|---|
| 0 | 0 | 0 | 0 | 0 | 0 | 0 |
| 0 | 0 | 0 | 0 | 0 | 1 | 0 |
| 0 | 0 | 0 | 0 | 1 | 0 | 1 |
| 0 | 0 | 0 | 0 | 1 | 1 | 1 |
| 0 | 0 | 0 | 1 | 0 | 0 | 0 |
| 0 | 0 | 0 | 1 | 0 | 1 | 0 |
| 0 | 0 | 0 | 1 | 1 | 0 | 1 |
| 0 | 0 | 0 | 1 | 1 | 1 | 1 |
| 0 | 0 | 1 | 0 | 0 | 0 | 0 |
| 0 | 0 | 1 | 0 | 0 | 1 | 0 |
| 0 | 0 | 1 | 0 | 1 | 0 | 1 |
| 0 | 0 | 1 | 0 | 1 | 1 | 1 |
| 0 | 0 | 1 | 1 | 0 | 0 | 0 |
| 0 | 0 | 1 | 1 | 0 | 1 | 0 |
| 0 | 0 | 1 | 1 | 1 | 0 | 1 |
| 0 | 0 | 1 | 1 | 1 | 1 | 1 |
| 0 | 1 | 0 | 0 | 0 | 0 | 1 |
| 0 | 1 | 0 | 0 | 0 | 1 | 1 |
| 0 | 1 | 0 | 0 | 1 | 0 | 0 |
| 0 | 1 | 0 | 0 | 1 | 1 | 0 |
| 0 | 1 | 0 | 1 | 0 | 0 | 1 |
| 0 | 1 | 0 | 1 | 0 | 1 | 1 |
| 0 | 1 | 0 | 1 | 1 | 0 | 0 |
| 0 | 1 | 0 | 1 | 1 | 1 | 0 |
| 0 | 1 | 1 | 0 | 0 | 0 | 1 |
| 0 | 1 | 1 | 0 | 0 | 1 | 1 |
| 0 | 1 | 1 | 0 | 1 | 0 | 0 |
| 0 | 1 | 1 | 0 | 1 | 1 | 0 |
| 0 | 1 | 1 | 1 | 0 | 0 | 1 |
| 0 | 1 | 1 | 1 | 0 | 1 | 1 |
| 0 | 1 | 1 | 1 | 1 | 0 | 0 |
| 0 | 1 | 1 | 1 | 1 | 1 | 0 |
| 1 | 0 | 0 | 0 | 0 | 0 | 0 |
| 1 | 0 | 0 | 0 | 0 | 1 | 0 |
| 1 | 0 | 0 | 0 | 1 | 0 | 1 |
| 1 | 0 | 0 | 0 | 1 | 1 | 1 |
| 1 | 0 | 0 | 1 | 0 | 0 | 0 |
| 1 | 0 | 0 | 1 | 0 | 1 | 0 |
| 1 | 0 | 0 | 1 | 1 | 0 | 1 |
| 1 | 0 | 0 | 1 | 1 | 1 | 1 |
| 1 | 0 | 1 | 0 | 0 | 0 | 0 |
| 1 | 0 | 1 | 0 | 0 | 1 | 0 |
| 1 | 0 | 1 | 0 | 1 | 0 | 1 |
| 1 | 0 | 1 | 0 | 1 | 1 | 1 |
| | | | | | | |

FIGURE 3

| *5* | *4* | *3* | *2* | *1* | *0* | *ENABLE* |
|---|---|---|---|---|---|---|
| 0 | *0* | 0 | 0 | *1* | 0 | 1 |
| 0 | *0* | 0 | 0 | *1* | 1 | 1 |
| 0 | *0* | 0 | 1 | *1* | 0 | 1 |
| 0 | *0* | 0 | 1 | *1* | 1 | 1 |
| 0 | *0* | 1 | 0 | *1* | 0 | 1 |
| 0 | *0* | 1 | 0 | *1* | 1 | 1 |
| 0 | *0* | 1 | 1 | *1* | 0 | 1 |
| 0 | *0* | 1 | 1 | *1* | 1 | 1 |
| 0 | *1* | 0 | 0 | *0* | 0 | 1 |
| 0 | *1* | 0 | 0 | *0* | 1 | 1 |
| 0 | *1* | 0 | 1 | *0* | 0 | 1 |
| 0 | *1* | 0 | 1 | *0* | 1 | 1 |
| 0 | *1* | 1 | 0 | *0* | 0 | 1 |
| 0 | *1* | 1 | 0 | *0* | 1 | 1 |
| 0 | *1* | 1 | 1 | *0* | 0 | 1 |
| 0 | *1* | 1 | 1 | *0* | 1 | 1 |
| 1 | *0* | 0 | 0 | *1* | 0 | 1 |
| 1 | *0* | 0 | 0 | *1* | 1 | 1 |
| 1 | *0* | 0 | 1 | *1* | 0 | 1 |
| 1 | *0* | 0 | 1 | *1* | 1 | 1 |
| 1 | *0* | 1 | 0 | *1* | 0 | 1 |
| 1 | *0* | 1 | 0 | *1* | 1 | 1 |
| | | | | | | |

FIGURE 3A

| *5* | *4* | *3* | *2* | *1* | *0* | *ENABLE* |
|---|---|---|---|---|---|---|
| 0 | 0 | 0 | 0 | 0 | 0 | S |
| 0 | 0 | 0 | 0 | 0 | 1 | |
| 0 | 0 | 0 | 0 | 1 | 0 | S |
| 0 | 0 | 0 | 0 | 1 | 1 | |
| 0 | 0 | 0 | 1 | 0 | 0 | P |
| 0 | 0 | 0 | 1 | 0 | 1 | |
| 0 | 0 | 0 | 1 | 1 | 0 | P |
| 0 | 0 | 0 | 1 | 1 | 1 | |
| 0 | 0 | 1 | 0 | 0 | 0 | M |
| 0 | 0 | 1 | 0 | 0 | 1 | |
| 0 | 0 | 1 | 0 | 1 | 0 | M |
| 0 | 0 | 1 | 0 | 1 | 1 | |
| 0 | 0 | 1 | 1 | 0 | 0 | |
| 0 | 0 | 1 | 1 | 0 | 1 | |
| 0 | 0 | 1 | 1 | 1 | 0 | |
| 0 | 0 | 1 | 1 | 1 | 1 | |
| 0 | 1 | 0 | 0 | 0 | 0 | S |
| 0 | 1 | 0 | 0 | 0 | 1 | |
| 0 | 1 | 0 | 0 | 1 | 0 | S |
| 0 | 1 | 0 | 0 | 1 | 1 | |
| 0 | 1 | 0 | 1 | 0 | 0 | |
| 0 | 1 | 0 | 1 | 0 | 1 | |
| 0 | 1 | 0 | 1 | 1 | 0 | P |
| 0 | 1 | 0 | 1 | 1 | 1 | |
| 0 | 1 | 1 | 0 | 0 | 0 | M |
| 0 | 1 | 1 | 0 | 0 | 1 | |
| 0 | 1 | 1 | 0 | 1 | 0 | M |
| 0 | 1 | 1 | 0 | 1 | 1 | |
| 0 | 1 | 1 | 1 | 0 | 0 | |
| 0 | 1 | 1 | 1 | 0 | 1 | |
| 0 | 1 | 1 | 1 | 1 | 0 | |
| 0 | 1 | 1 | 1 | 1 | 1 | |
| 1 | 0 | 0 | 0 | 0 | 0 | S |
| 1 | 0 | 0 | 0 | 0 | 1 | |
| 1 | 0 | 0 | 0 | 1 | 0 | S |
| 1 | 0 | 0 | 0 | 1 | 1 | |
| 1 | 0 | 0 | 1 | 0 | 0 | P |
| 1 | 0 | 0 | 1 | 0 | 1 | |
| 1 | 0 | 0 | 1 | 1 | 0 | P |
| 1 | 0 | 0 | 1 | 1 | 1 | |
| 1 | 0 | 1 | 0 | 0 | 0 | M |
| 1 | 0 | 1 | 0 | 0 | 1 | |
| 1 | 0 | 1 | 0 | 1 | 0 | M |
| 1 | 0 | 1 | 0 | 1 | 1 | |
| | | | | | | |

FIGURE 8

SECURITY SYSTEM WITH SERIAL NUMBER CODING AND METHODS THEREFOR

FIELD OF THE INVENTION

This invention relates to security systems, and in particular to a system and method for using a masking algorithm as an operator on a security system device serial number to ensure that the device is compliant with the system.

BACKGROUND OF THE INVENTION

Random or sequential serial numbers have been used to set up unique identification codes for various radio controlled appliances such as garage door openers, and security systems devices such as intrusion detectors, smoke alarms, PIR sensors, etc. These identification codes are embedded in each security system device and registered or "learned" at the time of their installation by the control panel that operates the security system. Once registered with the control panel, the device will be able to communicate with the control panel as required (e.g. send and receive status messages, etc.) A device that has not been properly registered will be unable to communicate with the control panel.

It may be desirable for a security system to register security devices manufactured at a certain location, but not from others, even if the serialization and other communications protocols would otherwise render the device registrable. As such, the present invention relates to the use of an encoding algorithm utilizing the existing serial number formats to allow or disallow registration of particular security devices, depending on the implementation of the algorithm.

SUMMARY OF THE INVENTION

Provided is a method for configuring a security system in which a plurality of security devices are programmed with a unique identification number, and those security devices are subsequently installed in a security system.

The security devices are programmed with unique identification numbers by first generating a series of initial serial numbers, and for each of those serial numbers, then applying a masking algorithm to the serial number. If is the masking application provides a true result, then the security device is programmed with that serial number. If the masking application provides a false result, then the serial number is discarded and not used.

The installation of the security device includes the process of obtaining the serial number from the security device, and then applying the masking algorithm to the serial number. Registration of the security device with the control panel is allowed if the masking algorithm application provides a true result, and registration is disallowed if the masking algorithm application provides a false result.

As a result, any security device that does not provide a true result when the masking algorithm is applied will not be registered. If a security device is provided to an installer by a manufacturer that has not utilized the masking as a sort of screening process, it may not be registrable.

BRIEF DESCRIPTION OF THE DRAWING

FIG. 3 is a table illustrating the functionality of an example masking algorithm;

FIG. 3A shows a table that contains the subset of those serial numbers used from the sample in FIG. 3;

FIG. 8 is a table showing the results of the logic operations of the circuit of FIG. 7.

DETAILED DESCRIPTION OF THE INVENTION

Figure 1A:
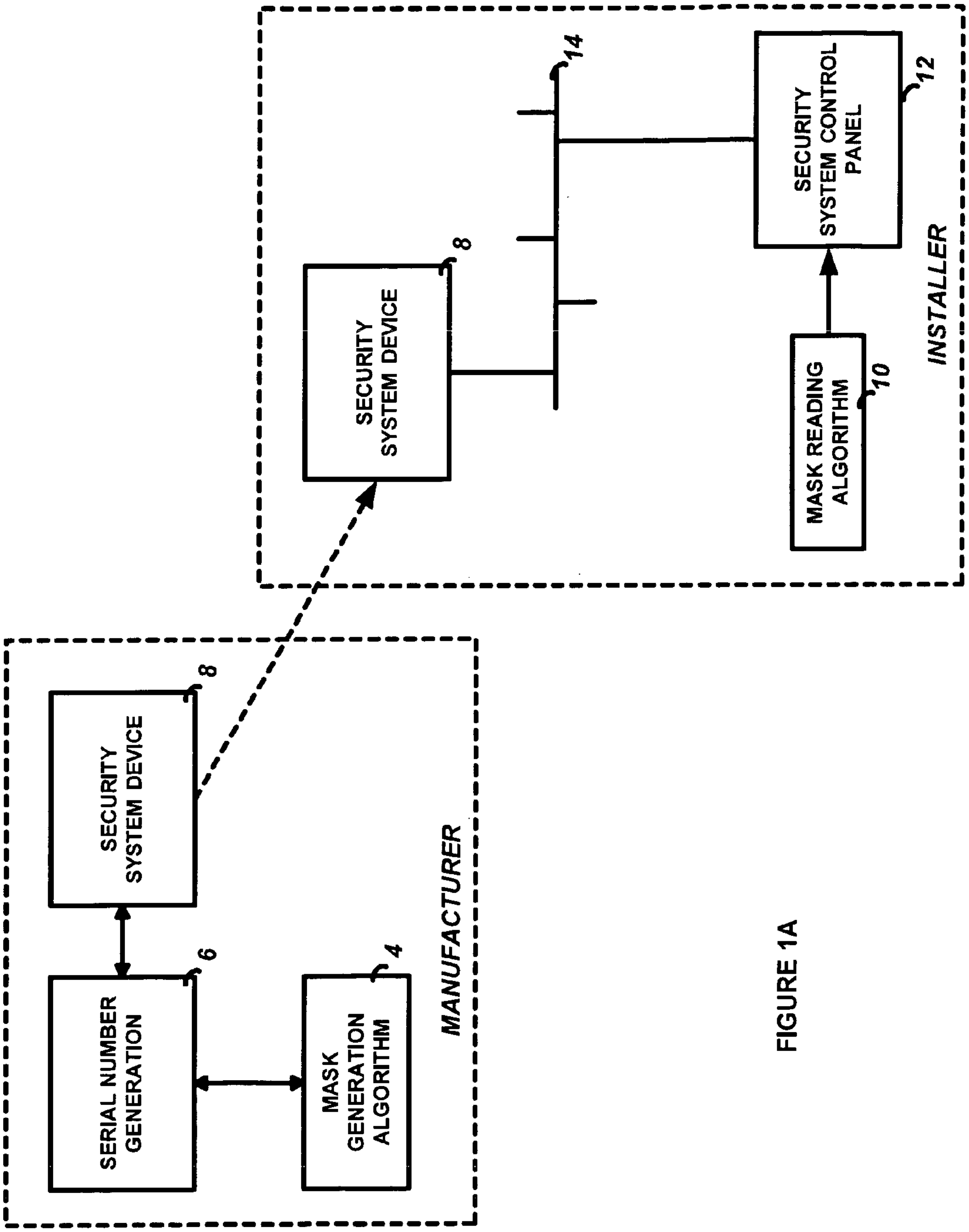
FIG. 1A is a block diagram of the system of the present invention.

The preferred embodiment of the present invention will now be described with respect to the Figures. A security system device 8, such as a PIR sensor, intrusion detector, smoke alarm or the like, is programmed with a unique serial number or identification number sometime during the manufacturing process. A serial number generation function 6 operates in conjunction with a mask generation algorithm 4 to utilize only certain serial numbers from the pool of available serial numbers; i.e. only those that meet or comply with the masking algorithm. After the device 8 is distributed to a system installer, it is physically connected to a control panel 12 (either by wired bus 14 or a wireless connection such as an RF link) and a registration or learning process is undertaken by the control panel. During this process, the control panel will store the serial number of the device 8 so that it can communicate with it during normal operation, as well known in the art. In accordance with this invention, a mask reading algorithm 10 is applied to ensure that the control panel will learn only the serial numbers of the compliant devices 8.

Figure 2:
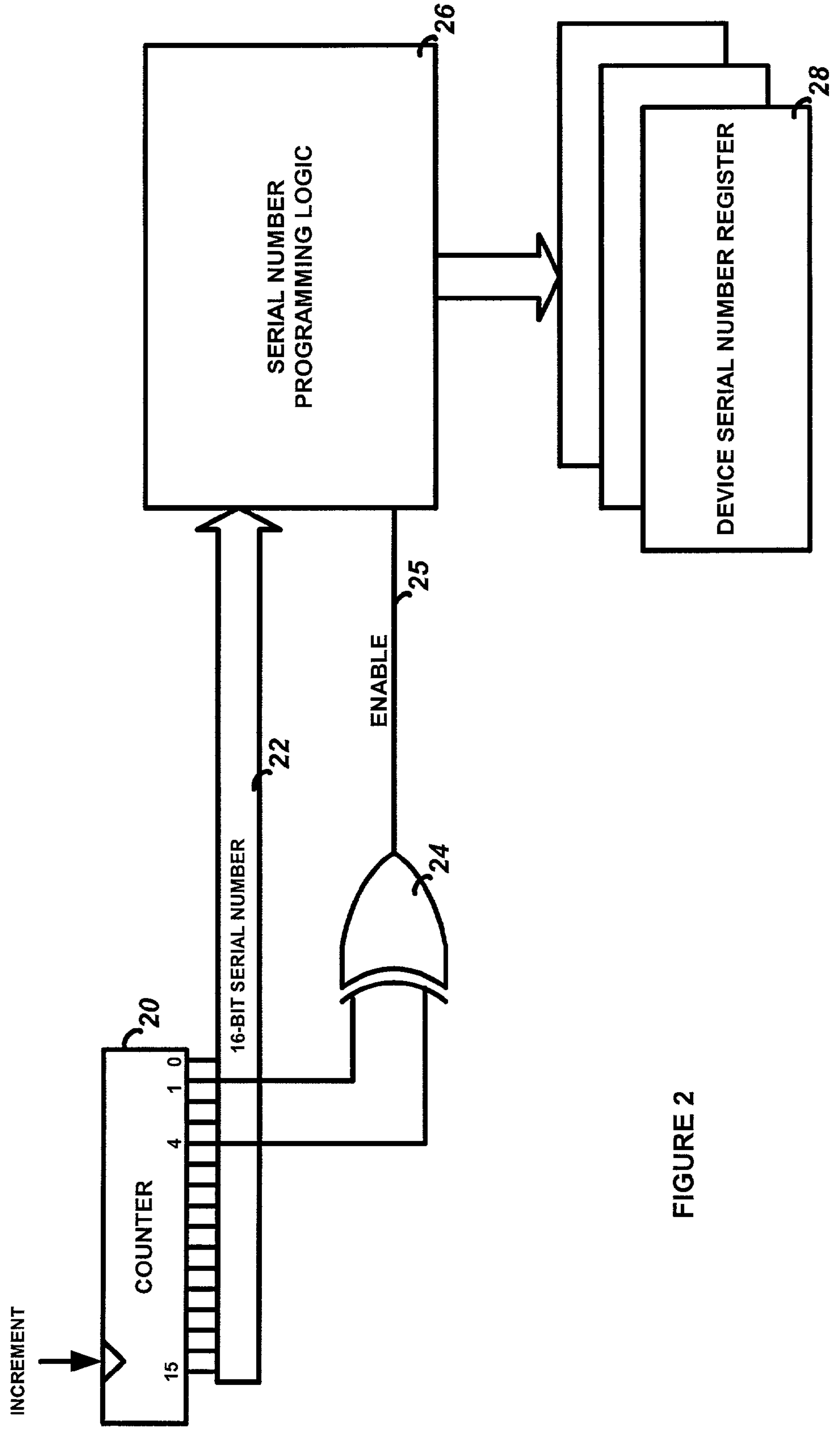
FIG. 2 is detailed block diagram illustrating the encoding of the serial number in conjunction with the masking algorithm.
Figure 5:
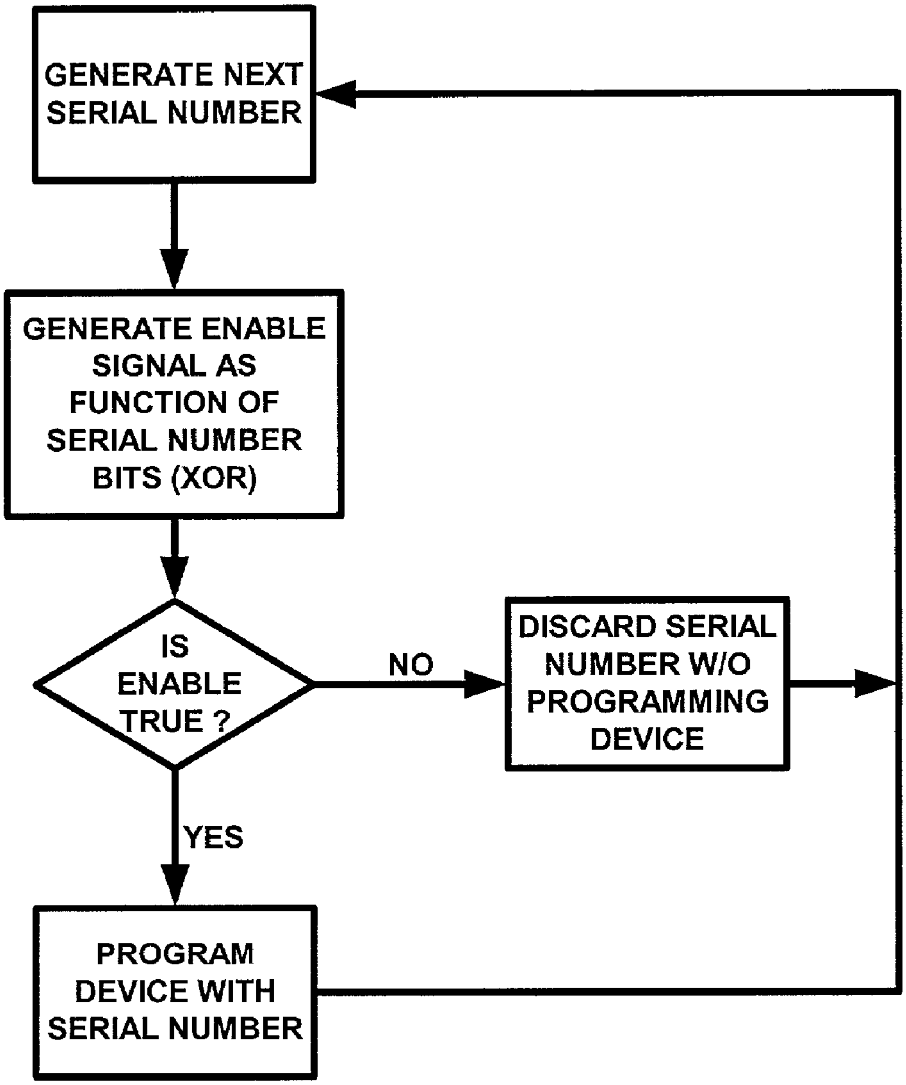
FIGS. 5 and 6 are flowcharts of the present invention.

FIG. 2 illustrates an exemplary embodiment of the serial number generation and masking of the present invention, and FIG. 5 is a flowchart of the methodology employed. In this embodiment, serial numbers are generated sequentially by using a counter function 20, which simply cycles through a given pool of serial numbers as required. A 16-bit serial number 20 is generated that can range from 0000000000000000 to 1111111111111111. Of course, any size serial number may be used, and a 16-bit number is shown here for illustration purposes only. In addition, other types of serial number generation methods may be used, such as a random or pseudo-random number generator.

An exclusive-OR gate 24 operates on two of the available bits, which may be arbitrarily chosen. In this example, Bit 1 and Bit 4 are used, but any combination will work within the spirit and scope of this invention. Moreover, any number of inputs may be used, bearing in mind that the number of bits operated on will affect the amount of available serial numbers as will become apparent below.

An Enable signal 25 is generated by the XOR gate 24, which will be true (logic 1) whenever the inputs bits are different, and which will be false (logic 0) when they are the same. FIG. 3 is a table that shows the progression of this relationship for a sample subset of the available states of the serial number. Whenever the Enable signal 25 is true, the serial number 22 will be utilized by the programming logic function 26 to program the associated device with that serial is 15 number by programming it into a register 28 on the device as well known in the art. Whenever the Enable signal 25 is false, however, the serial number will be discarded and not programmed into the register 28. The counter 20 will increment to the next sequential serial number, and the same logic process will be undertaken until the Enable signal 25 is true and the associated serial number is used to program the device.

As a result, only those serial numbers where Bit 1 and Bit 4 have different values will be used; those where both bits are logic one or both bits are logic 0 will not be used. FIG. 3A shows a table that contains the subset of those serial numbers used from the sample in FIG. 3. As a variation, any logic function such as an OR gate or an AND gate could be used, and of course the resulting truth table that produces Enable 25 will change accordingly.

Figure 4:
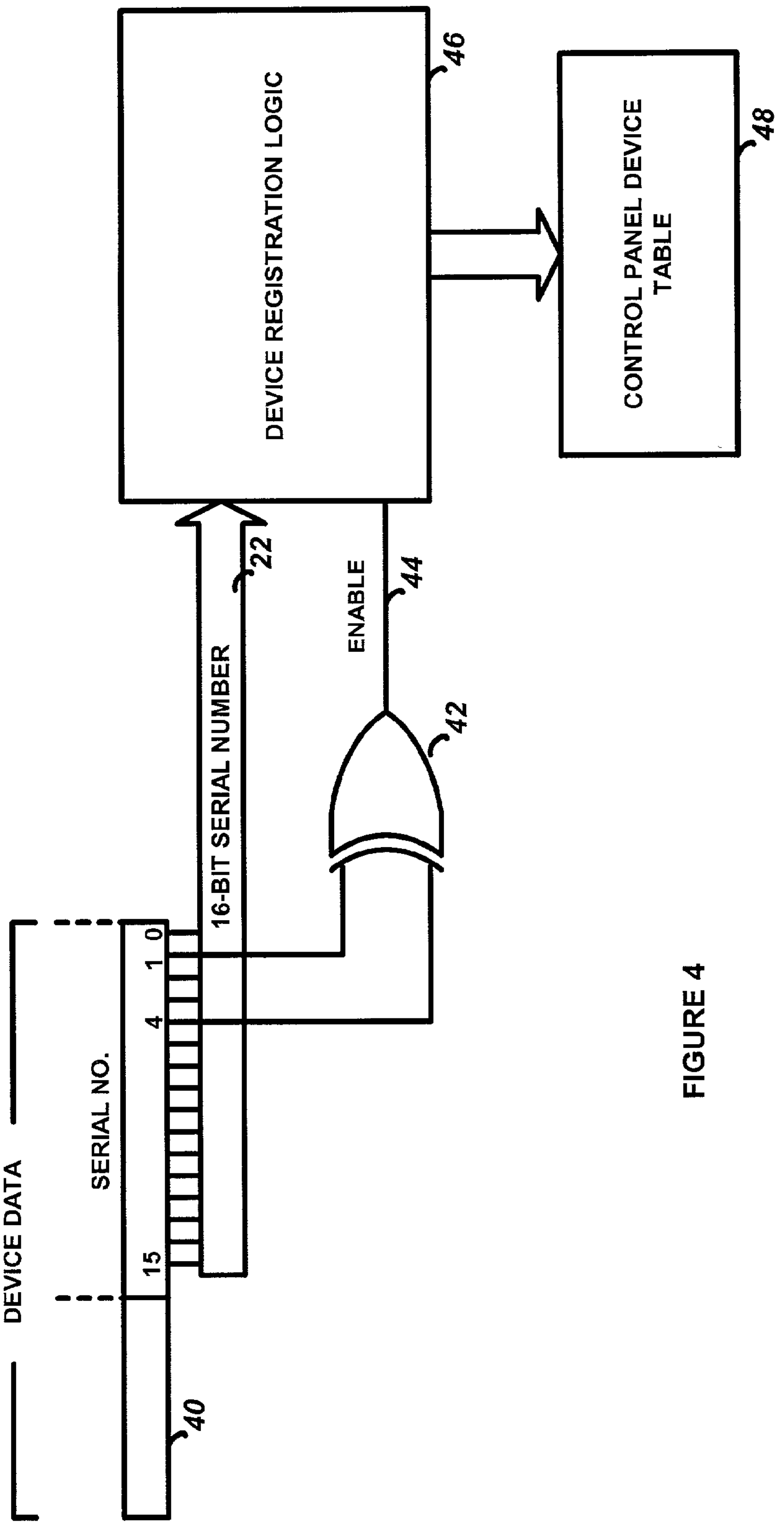
FIG. 4 is a block diagram of the application of the masking algorithm at the device registration.
Figure 6:
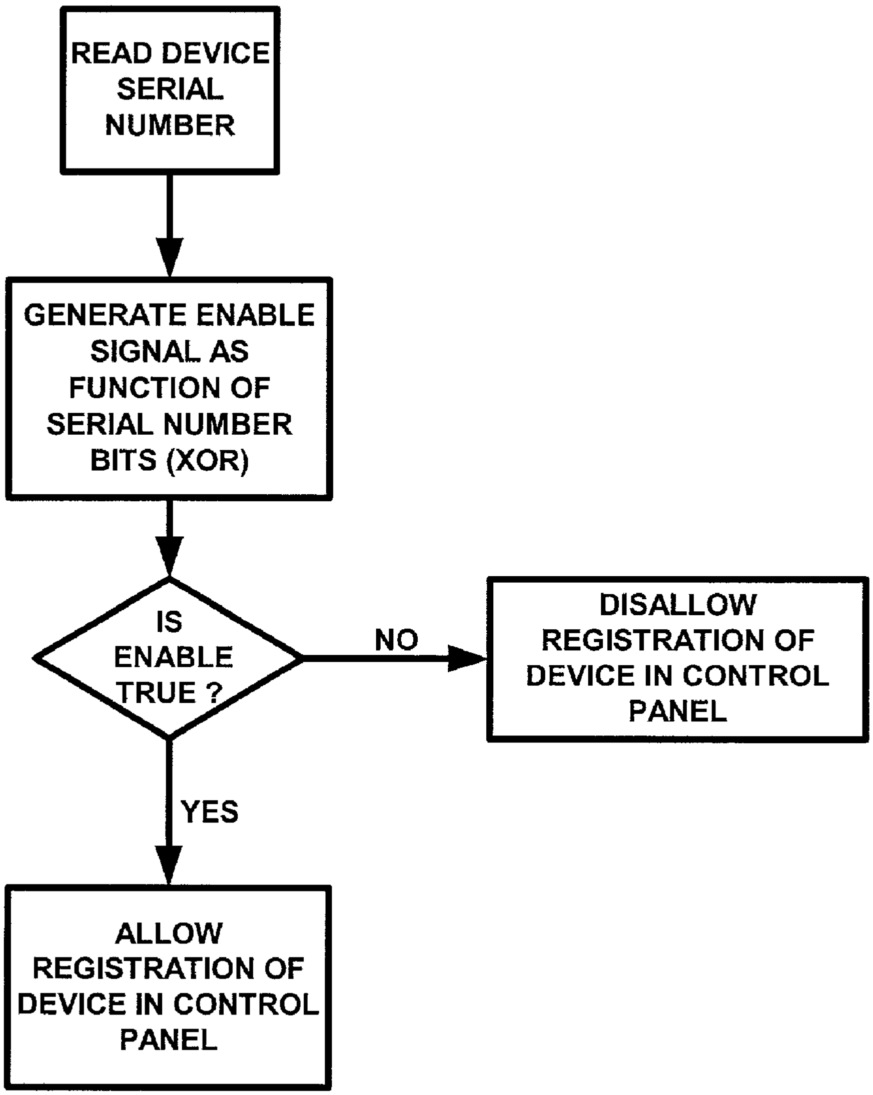

FIG. 4 is a block diagram of the application of the masking algorithm at the device registration stage, used to ensure that only compliant devices will be learned by the control panel. FIG. 6 is a flowchart of the methodology employed herein. A device data word 40 is output by the device during the learning/registration stage in a manner well known in the art. Included in the device data word 40 is the device serial number 22, which had been previously programmed into the device as explained above. Bits 1 and 4 are extracted by the control panel logic and input into an exclusive-OR gate 42, and an Enable signal 44 is generated by the output of the XOR gate. When Bits 1 and 4 are opposite states, then the Enable signal 44 is true, and the device registration logic 46 is allowed to store the serial number 22 into the control panel device table 48, as well known the art. This table 48 is used by the control panel during normal operations to determine if the device that is trying to communicate with the control panel has been properly registered. Of course, any device that has been manufactured using the masking algorithm explained in FIG. 2 will be compliant with the registration process described here, and will be properly registered in the table 48.

If, however, a non-compliant device (i.e. one with bits 1 and 4 both logic 0 or both logic 1) tries to register with the control panel, then the Enable signal 44 will be false and the device registration logic will disallow registration of the serial number 22 with the control panel device table 48. Optionally, user feedback could be provided (such as a beep or visual display), to signal to the installer that the process has failed.

The masking functionality employed by this invention may also be used for another purpose; for segregating device types amongst the available serial numbers, rather than (or in addition to) filtering out serial numbers from the available pool. That is, by preparing appropriate logic functions with selected bits of the serial number, certain serial numbers can be used to program smoke alarms, others can be used to program PIRs, etc., depending on the bits chosen, the algorithm (i.e. logic) chosen, etc. This may result in sequential blocks of numbers being used for a given type of device (in a simple case), but it is not necessary to have sequential numbers.

Figure 7:
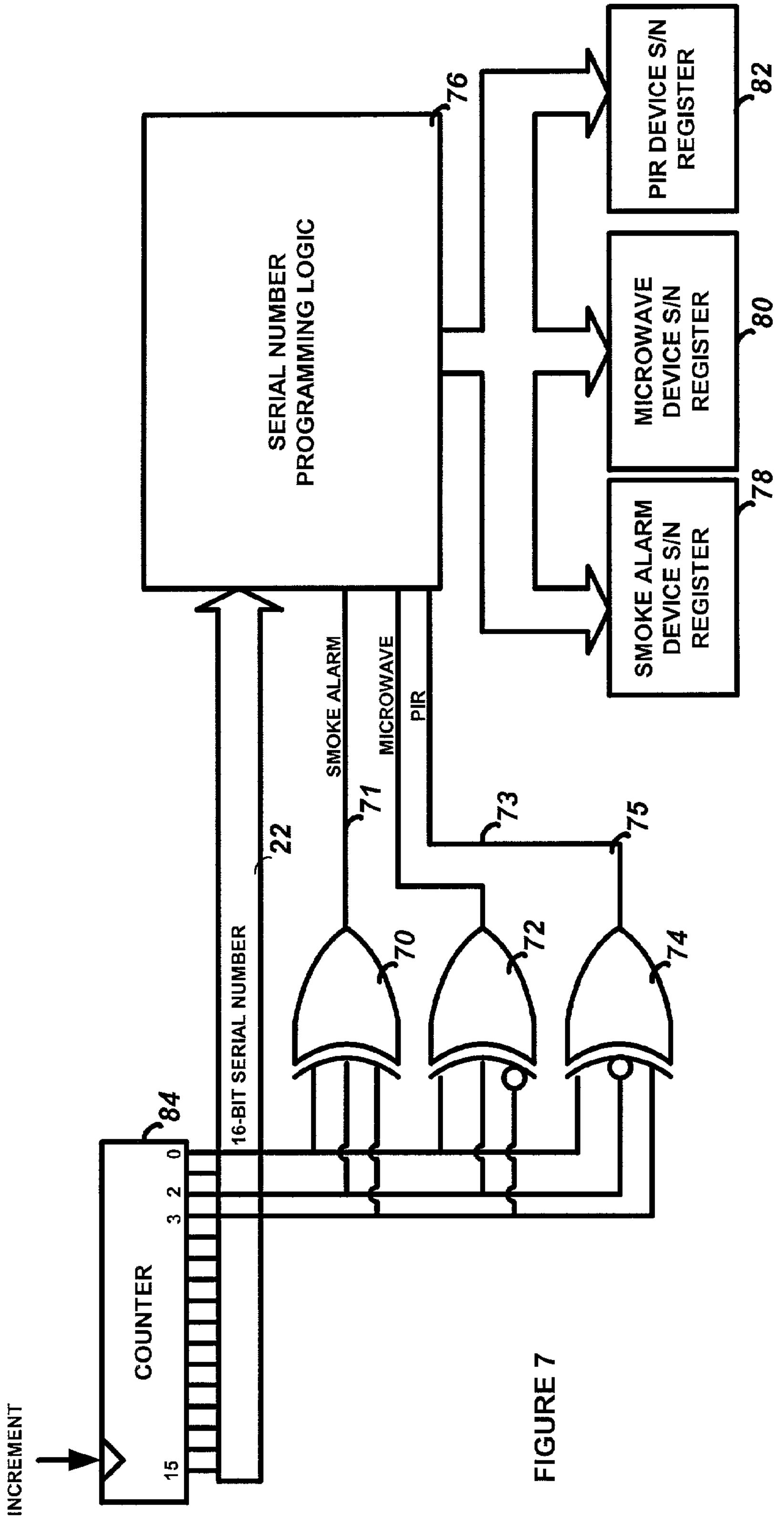
FIG. 7 is a block diagram of an alternative embodiment of the invention.

FIG. 7 illustrates an example of this embodiment. There, three types of devices may be programmed with serial numbers as determined by logic functions 70, 72 and 74. That is, smoke alarm device serial number registers 78, microwave device serial number registers 80, and PIR device serial number registers 82 will be programmed with a given serial number in accordance with the map shown in FIG. 8. When SMOKE ALARM signal 71 is true due to the logic states of Bits 0, 2 and 3, then the serial number 22, generated by the counter 84, will be used to program the serial number register of a smoke alarm device 78. When MICROWAVE signal 73 is true due to the logic states of Bits 0, 2 and 3, then the serial number 22 will be used to program the serial number register of a microwave device 80. When PIR signal 82 is true due to the logic states of Bits 0, 2 and 3, then the serial number 22 will be used to program the serial number register of a PIR device 82. Other logic functions and bit selections may of course be made in the spirit and scope of this invention.

At the control panel, similar logic functions will be utilized to parse the serial number of a device that is being registered, and the control panel logic will know that type of device being registered by examining the serial number bits in the same manner. This information can be used by the control panel in any manner necessary as a result of this intelligent registration process.

What is claimed is:

1. A method for configuring a security system, comprising:

a) programming a plurality of security devices with a unique identification number, comprising the steps of generating a series of initial serial numbers;
   for each of said serial numbers,
      applying a masking algorithm to said serial number;
      programming a security device with said serial number if said masking application provides a true result; and
      discarding said serial number if said masking application provides a false result; and b) installing at least one of the plurality of security devices in a security system, comprising the steps of
   reading the serial number from the security device;
   applying the masking algorithm to said serial number;
   allowing registration of the security device with the security system if said masking algorithm application provides a true result;
   disallowing registration of the security device with the security system if said masking algorithm application provides a false result.

2. The method of claim wherein the step of generating a series of serial numbers is implemented by a serial counter.

3. The method of claim 1 wherein the masking algorithm is a logical operation performed on a subset of the serial number.

4. The method of claim 3 wherein the masking algorithm is an exclusive-OR operation performed on two bits of the serial number.

5. A method for configuring a security device with an identification number, comprising:

programming a plurality of security devices with a unique identification number, comprising:
   generating a series of initial serial numbers;
   for each of said serial numbers,
      applying a masking algorithm to said serial number;
      programming a security device with said serial number if said masking application provides a true result; and
      discarding said serial number if said masking application provides a false result.

6. The method of claim 5 wherein the step of generating a series of serial numbers is implemented by a serial counter.

7. The method of claim 5 wherein the masking algorithm is a logical operation performed on a subset of the serial number.

8. The method of claim 7 wherein the masking algorithm is an exclusive-OR operation performed on two bits of the serial number.

9. A method for configuring a security system, comprising:

installing at least one of a plurality of security devices in a security system, comprising the steps of reading a serial number from the security device;

applying a masking algorithm to said serial number;

allowing registration of the security device with the security system if said masking algorithm application provides a true result;

disallowing registration of the security device with the security system if said masking algorithm application provides a false result.

10. The method of claim 9 wherein the step of generating a series of serial numbers is implemented by a serial counter.

11. The method of claim 9 wherein the masking algorithm is a logical operation performed on a subset of the serial number.

12. The method of claim 11 wherein the masking algorithm is an exclusive-OR operation performed on two bits of the serial number.

13. A method for configuring a security system with a plurality of different device types, comprising:

a) programming a plurality of security devices with a unique identification number, comprising the steps of generating a series of initial serial numbers;

for each of said serial numbers, applying a first masking algorithm to said serial number;

programming a security device of a first type with said serial number if said first masking application provides a true result;

applying a second masking algorithm to said serial number;

programming a security device of a second type with said serial number if said second masking application provides a true result; and b) installing at least one of the plurality of security devices in a security system, comprising the steps of reading the serial number from the security device;

applying the first masking algorithm to said serial number;

allowing registration of the security device with the security system as a first device type if said first masking algorithm application provides a true result;

applying the second masking algorithm to said serial number; and allowing registration of the security device with the security system as a second device type if said second masking algorithm application provides a true result.

14. The method of claim 13 comprising the further step of disallowing registration of the security device with the security system if said first masking algorithm application and said second masking algorithm application both provide a false result.

15. A security system comprising:

a) a plurality of security devices programmed with a unique identification number; and b) means for registering selected ones of the security devices comprising:

i) means for reading the serial number from the security device;

ii) means for applying a masking algorithm to said serial number; and iii) means for allowing registration of the security device with the security system if said masking algorithm application provides a true result, and for disallowing registration of the security device with the security system if said masking algorithm application provides a false result.

16. The security system of claim 15 wherein the identification number is programmed by the steps of a) generating a series of initial serial numbers;

b) for each of said serial numbers, i) applying a masking algorithm to said serial number;

ii) programming the security device with said serial number if said masking application provides a true result; and iii) discarding said serial number if said masking application provides a false result.

17. The security system of claim 16 wherein the masking algorithm is a logical operation performed on a subset of the serial number.

18. The security system of claim 17 wherein the masking algorithm is an exclusive-OR operation performed on two bits of the serial number.

* * * * *